(12) United States Patent
Armstong et al.

(10) Patent No.: US 10,598,254 B2
(45) Date of Patent: Mar. 24, 2020

(54) HIGH TORQUE TRANSMISSION

(71) Applicant: Nord-Lock Australia Pty Ltd, St. Lucia, QLD (AU)

(72) Inventors: Peter Elliot Armstong, St. Lucia (AU); Andrew Duncan McPhee, St. Lucia (AU)

(73) Assignee: Nord-Lock Australia Pty Ltd, St. Lucia, QLD (AU)

(*) Notice: Subject to any disclaimer, the term of this patent is extended or adjusted under 35 U.S.C. 154(b) by 0 days.

(21) Appl. No.: 15/556,008

(22) PCT Filed: Mar. 8, 2016

(86) PCT No.: PCT/AU2016/000073
§ 371 (c)(1),
(2) Date: Sep. 6, 2017

(87) PCT Pub. No.: WO2016/141407
PCT Pub. Date: Sep. 15, 2016

(65) Prior Publication Data
US 2018/0058544 A1    Mar. 1, 2018

(30) Foreign Application Priority Data

Mar. 9, 2015  (AU) ................................ 2015900833
May 25, 2015 (AU) ................................ 2015202820

(51) Int. Cl.
*B25B 17/02*   (2006.01)
*F16H 1/16*    (2006.01)
*F16H 55/22*   (2006.01)

(52) U.S. Cl.
CPC ............. *F16H 1/163* (2013.01); *B25B 17/02* (2013.01); *F16H 55/22* (2013.01)

(58) Field of Classification Search
CPC .......... F16H 1/163; F16H 55/24; F16H 55/22; B25B 17/02
(Continued)

(56) References Cited

U.S. PATENT DOCUMENTS

| 29,634 A | * | 8/1860 | Street ...................... F16H 55/10 |
| | | | 74/465 |
| 840,157 A | * | 1/1907 | Otis ........................ F16H 55/22 |
| | | | 74/458 |

(Continued)

FOREIGN PATENT DOCUMENTS

| BE | 1016310 | 7/2006 | |
| CN | 107816512 A | * 3/2018 | ............. F16H 1/163 |

(Continued)

OTHER PUBLICATIONS

ISR from corresponding PCT/AU2016/000073.
(Continued)

*Primary Examiner* — Jake Cook
*Assistant Examiner* — Gregory Robert Weber
(74) *Attorney, Agent, or Firm* — Stephen T. Scherrer; Monique A. Morneault; Scherrer Patent & Trademark Law. P.C.

(57) ABSTRACT

A worm drive has a worm and a worm wheel. Meshing assemblies are formed about the worm wheel each comprising a ball and a cup receiving a portion of the ball. Each cup is orientated at an acute angle toward the worm drive relative to a periphery of the wheel. The worm presents a concavely tapering side profile complementing a peripheral portion of the worm wheel. Consequently portions of the balls mesh with the worm and are free to rotate and so reduce shear forces between the worm and the worm wheel in use.

8 Claims, 4 Drawing Sheets

(58) Field of Classification Search
USPC .................. 74/425, 424.81, 424.89
See application file for complete search history.

(56) References Cited

U.S. PATENT DOCUMENTS

| | | | | | |
|---|---|---|---|---|---|
| 1,518,707 | A | * | 12/1924 | Sleeper | B23D 1/00 409/333 |
| 1,885,970 | A | * | 11/1932 | Westling | F16H 25/2233 74/424.89 |
| 2,338,367 | A | | 1/1944 | Trbojevich | |
| 2,408,666 | A | * | 10/1946 | Mallard | F16H 55/10 474/153 |
| 3,377,879 | A | * | 4/1968 | Shiwaku | F16H 1/163 74/425 |
| 4,665,763 | A | * | 5/1987 | James | F16H 1/166 74/425 |
| 4,665,765 | A | * | 5/1987 | Heine | F16H 1/163 74/424.93 |
| 4,900,059 | A | * | 2/1990 | Kinoshita | B62D 1/181 280/775 |
| 5,630,343 | A | * | 5/1997 | Begin | B25B 13/481 81/57.13 |
| 6,402,652 | B1 | | 6/2002 | Fleytman et al. | |
| 7,028,572 | B2 | * | 4/2006 | Willmot | F16H 1/166 74/340 |
| 7,484,438 | B2 | * | 2/2009 | Murphy | B23Q 5/045 81/57.13 |
| 7,771,307 | B2 | * | 8/2010 | Fujii | F16H 25/2233 475/343 |
| 2006/0156845 | A1 | * | 7/2006 | Tong | F16H 1/163 74/425 |
| 2008/0127711 | A1 | * | 6/2008 | Farag | B25B 23/1425 73/1.11 |
| 2012/0279362 | A1 | * | 11/2012 | Cummings | B25B 13/06 81/57.11 |

FOREIGN PATENT DOCUMENTS

| | | | | | |
|---|---|---|---|---|---|
| DE | 353540 | C | * | 5/1922 | ............ F16H 1/163 |
| DE | 19518194 | | | 11/1996 | |
| EP | 2251564 | A1 | * | 11/2010 | ............ F16H 1/163 |
| FR | 366535 | A | * | 10/1906 | ............ F16H 1/163 |
| GB | 138841 | A | * | 2/1920 | ............ F16H 1/163 |
| JP | 4813751 | | | 2/1973 | |
| JP | 5182499 | | | 1/1975 | |
| JP | 6261471 | | | 4/1987 | |
| JP | 62194228 | | | 12/1987 | |
| JP | H05302649 | | | 11/1993 | |
| JP | 200492908 | | | 3/2004 | |
| JP | 3143218 | | | 6/2008 | |
| JP | 2013220499 | | | 10/2013 | |
| JP | WO2013141002 | A1 | * | 8/2015 | ............ F16H 1/163 |
| WO | 2013141002 | | | 9/2013 | |

OTHER PUBLICATIONS

European Search Report from corresponding European Patent Application No. 16760910.6.

Office action from Japanese Patent Office dated Dec. 23, 2019 for corresponding Japanese Application No. 2017-566171. The office action discusses the attached references.

* cited by examiner

HIGH TORQUE TRANSMISSION

TECHNICAL FIELD

The present invention relates to worm drives and to worm drives configured as mechanical torque multipliers for imparting high torques to a load.

BACKGROUND

Any references to methods, apparatus or documents of the prior art are not to be taken as constituting any evidence or admission that they formed, or form part of the common general knowledge.

Worm and gear mechanisms have been known for centuries for use in speed reduction, torque multiplication and general applications where a rotational-to-rotational transmission is required.

The most basic worm and gear mechanism includes a worm of constant pitch thread that meshes with the teeth of a gear or "worm wheel".

In such a mechanism only one of the teeth is forced by the worm at any one time. That is, the gear and worm contact is restricted to one sweet point of contact that is a sliding contact between each main component. Only at the exact perpendicular point between the gear and the worm is contact made and that point carries all the torque driving force in sliding contact.

More complex worms, which are capable of imparting force along a longer arc between the gear and worm are known and these may be referred to as "helical", "hourglass" or "globoid" worms. For example, U.S. Pat. No. 2,338,367 to Trbojevich describes a truncated, tapering globoid worm which is designed to drive its gear either forwardly or backwardly.

A problem that may arise in such a worm drive is that of undue wear occurring between the teeth of the gear and the worm.

One approach to addressing the problem of wear is described in European Patent Application No. EP2251564A1 to Meko Seiki Inc. in which the worm gear includes peripheral magnets, each of which hold a ball to a respective socket formed in the wheel. The balls mesh with the thread of the helical worm so that there is a rolling contact between the worm and the gear wheel. It will be realized however that manufacturing a gear wheel with precisely located peripheral magnets is a complex endeavor. Furthermore, the magnets are at risk of becoming demagnetized in which case the balls are no longer held in place. In addition, the balls are subject to considerable shear forces which is undesirable.

Another approach to providing rolling contact between a worm and a gear is set forth in US Patent Publication No. US20060156845 to Tong, wherein the balls circulate along a helical track of the worm and are recirculated through a tunnel formed therethrough. However, the worm drive described in Tong may not be able to transmit high torques from the worm to the gear as would be desirable in a torque multiplier for use as a wrench or a winch.

It is an object of the invention to provide an improved worm drive that is capable of operating at high levels of torque.

SUMMARY OF THE INVENTION

According to a first aspect of the present invention there is provided a worm drive including a worm and a worm wheel including:

a. meshing assemblies formed about the worm wheel each comprising a ball and a cup receiving a portion of the ball, each cup orientated at an acute angle relative to a periphery of said wheel
b. wherein the worm presents a concavely tapering side profile complementing a peripheral portion of the worm wheel,
c. whereby portions of the balls mesh with the worm and are free to rotate thereby reducing shear forces between the worm and the worm wheel in use.

Preferably the worm comprises at least one helical thread defining a track for the ball, the track being concave in profile.

The worm drive may be configured as a torque multiplier wherein a complete rotation of the worm causes a partial rotation of the worm drive about an axis thereof.

In a preferred embodiment of the invention the worm meshes with at least three meshing assemblies.

Preferably the worm includes a formation for ready coupling to a driving member. For example, the formation may comprise a hex socket.

In a preferred embodiment of the invention the worm drive is configured as a socket wrench wherein the worm wheel includes a socket to receive a head of a bolt.

Preferably the worm drive includes a housing for the worm and worm wheel which retains the worm and worm wheel in mutual engagement.

BRIEF DESCRIPTION OF THE DRAWINGS

Preferred features, embodiments and variations of the invention may be discerned from the following Detailed Description which provides sufficient information for those skilled in the art to perform the invention.

The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1A:
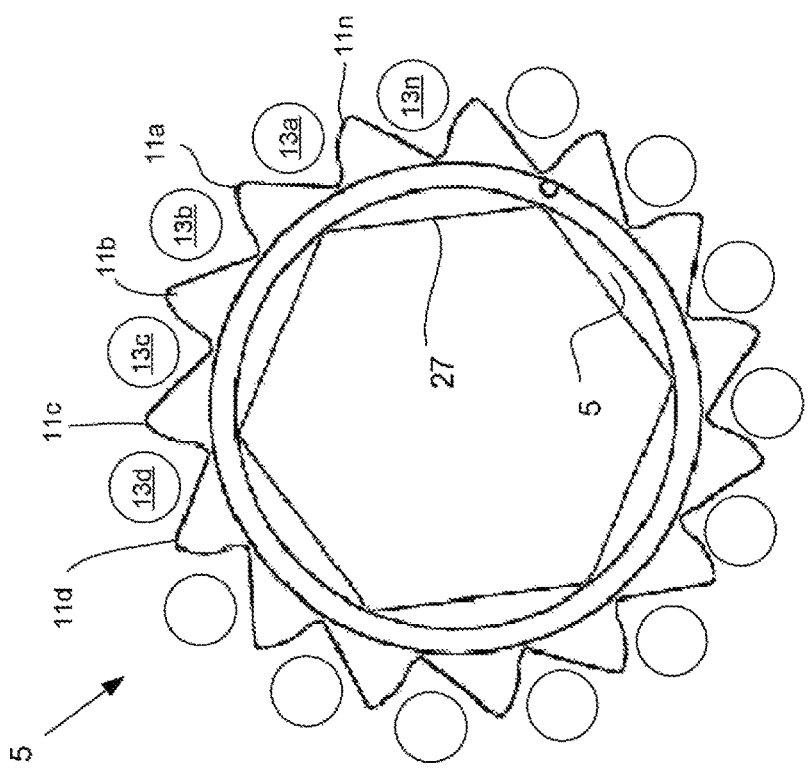
FIG. 1A is an exploded view of a worm wheel of the worm drive of FIG. 1.
Figure 1:
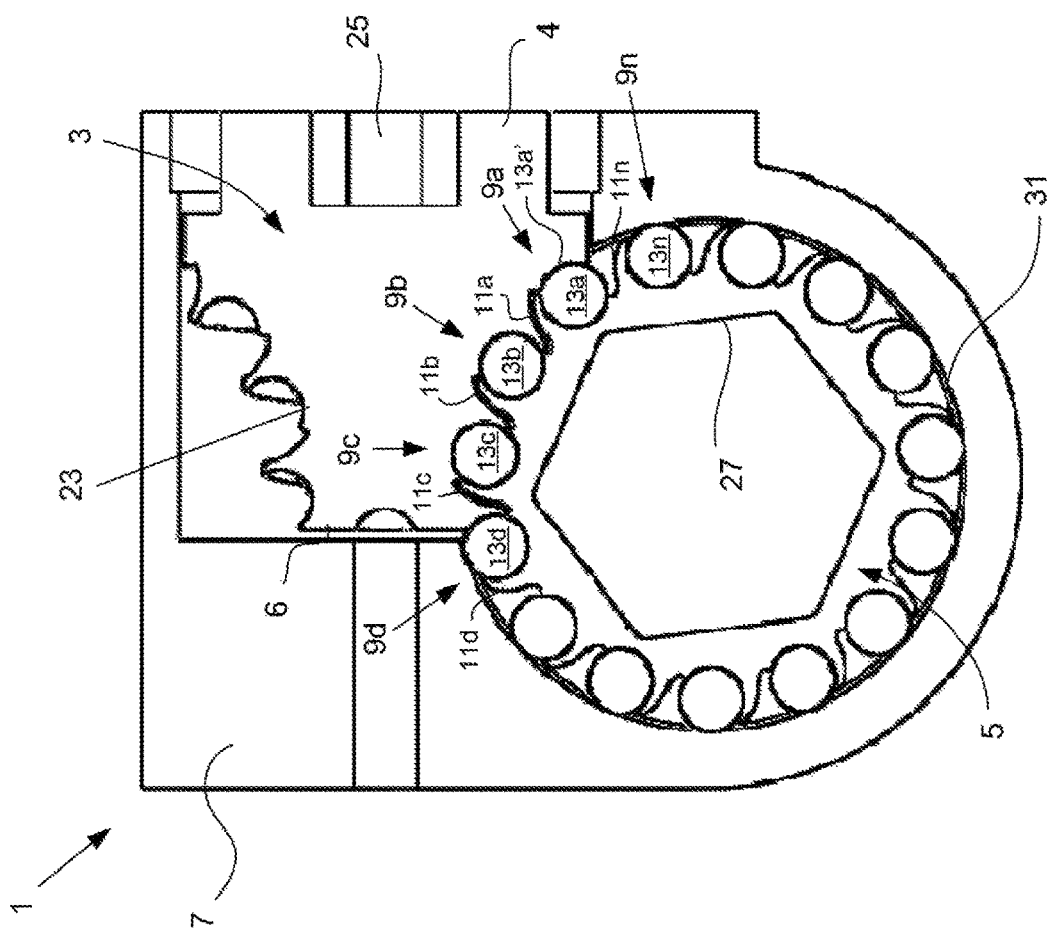
FIG. 1 is cross section through a worm drive according to a preferred embodiment of the present invention.
Figure 2:
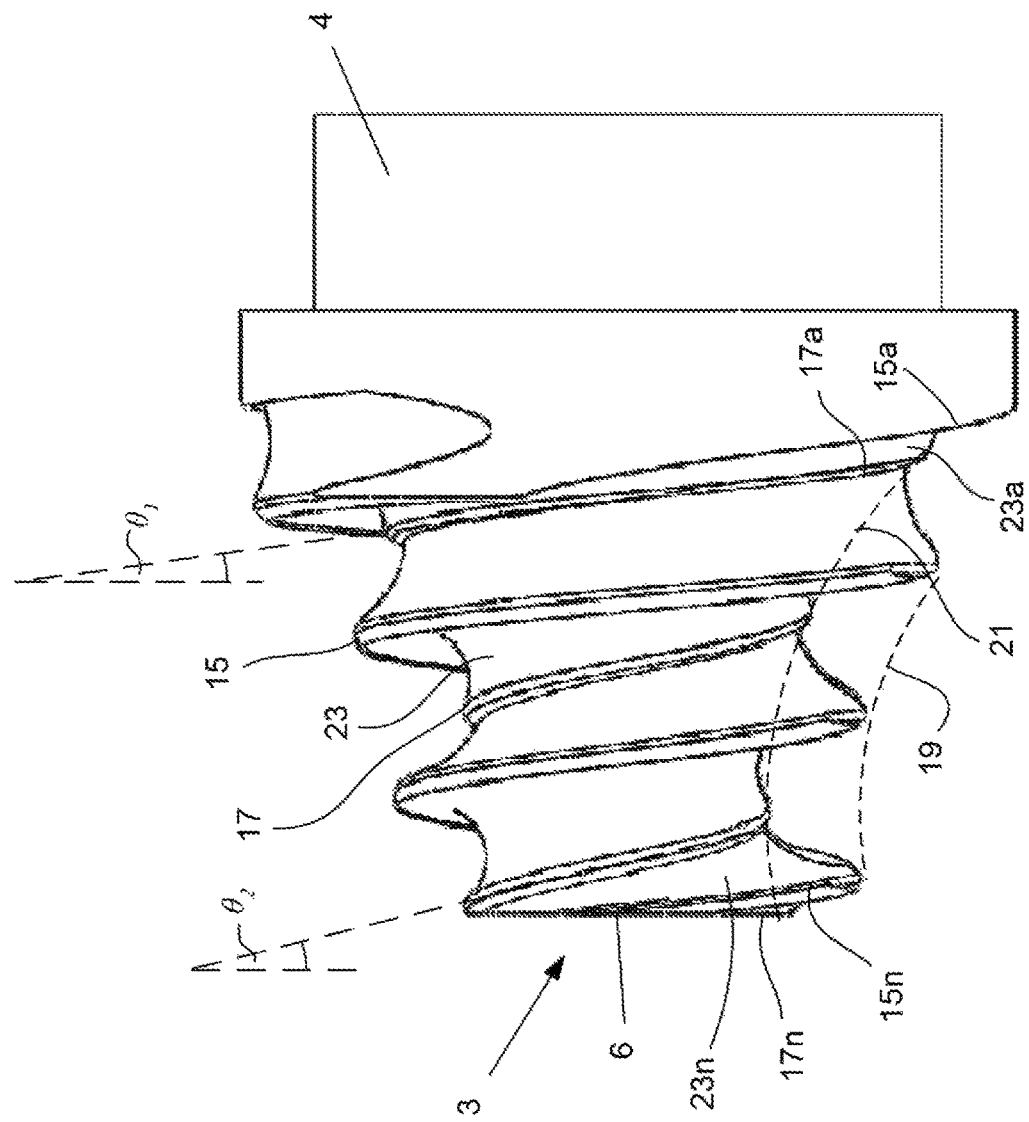
FIG. 2 is a side view of a worm of the worm drive of FIG. 1.
Figure 3:
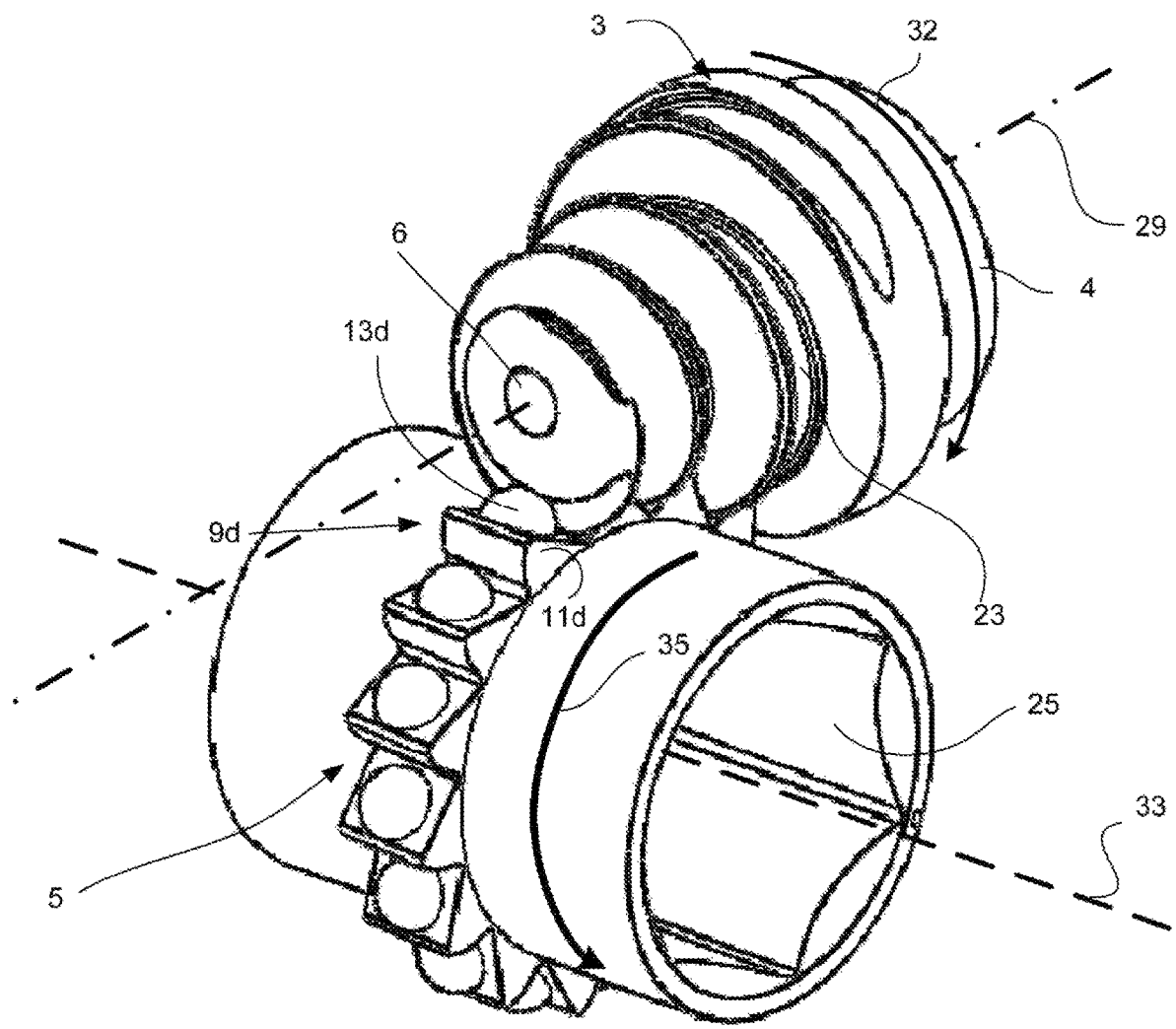
FIG. 3 is an isometric view of the worm drive of FIG. 1 with housing removed.

Referring now to FIG. 1 there is depicted a cross section of a worm drive 1 according to preferred embodiment of the present invention. The worm drive 1 is comprised of a worm 3 that meshes with a worm wheel 5, the worm and worm wheel being mutually held in mesh by housing 7. FIGS. 2 and 3 of the drive are respectively side and isometric views of the worm drive 1 with housing 7 removed for clarity.

It will be observed that meshing assemblies 9a, . . . , 9n of the worm wheel 5 are each comprised of integrally formed supports in the form of cups 11a, . . . , 11n. The cups each receive a ball 13a, . . . , 13n. In the presently described preferred embodiment each ball 13a, ..., 13n is free to rotate in its respective cup. FIG. 1A is an exploded view of the worm wheel showing the balls outside of their respective cups.

Each ball 13a, ..., 13n has a surface area portion that faces outwardly from its respective cup 11a, ..., 1n so as to present a spherical face to the worm 3.

As best seen in FIG. 2 the worm 3 is formed with first and second threads 15, 17 which each proceed from a shank end (15a, 17a) adjacent shank 4 to a tip end (15n, 17n) adjacent tip 6. As indicated by dashed lines 19, 21, the threads 15, 17 present a concavely tapering side profile. The side profile of the worm 3 complements the meshing assemblies 9a, ..., 9n of the periphery of the worm wheel 5 whereby portions of the spherical faces of the balls 13a, ..., 13n mesh with a concave track 23 that runs between the threads 15, 17.

Referring again to FIG. 1, the balls 13a, ..., 13n are retained in the sockets of their respective cups 11a, ..., 11n either by the track 23 of the worm 3 or by a bearing race 31 that is formed into the housing 7 around the outside of the worm wheel 5.

In the presently described preferred embodiment of the invention the track 23 meshes with four meshing assemblies 9a, ..., 9d.

Referring again to FIG. 1, the worm 3 includes a formation, namely a hex socket 25 for ready coupling to a driving member such as an elongate handle.

In the presently described preferred embodiment the worm drive 1 is configured as a socket wrench and so the worm wheel 5 includes a central socket 27 to rotate a head of a bolt in use. The worm drive 1 is configured as a torque multiplier wherein a complete rotation of the worm 3 causes a partial rotation of the worm wheel 5 about its axis.

Referring to FIG. 3, in use the worm 3 is rotated about its axis 29 in the direction indicated by arrow 32. As the worm 3 rotates the spherical faces of the balls 13a, ..., 13n of the meshing assemblies 9a, ..., 9n of the worm wheel 5 mesh with the track 23 of the worm and so are forced about the axis 33 of the worm wheel 5 in the direction indicated by arrow 35.

The largest diameter thread portion 15a (shown in FIG. 2) provides the largest driving force against the teeth because thread portion 15a has the largest radius and the smallest pitch angle. As can be seen in FIG. 2, the pitch angle decreases from the shaft end of the worm to its far end. For example, $\theta_1$, being the pitch angle of the second thread towards the shank 4 end of the worm 3 is less than $\theta_2$, being the pitch angle of the second thread towards the tip 6 of worm 3.

As the worm 3 rotates it tracks one ball per one worm rotation. Consequently, if there are fifteen meshing assemblies about the worm wheel 5, as shown in FIG. 1, then the torque multiplication ratio is 15:1.

As the faces of the balls 13a, ..., 13n engage the largest diameter track portion 23a the balls 13a, ..., 13n tend to rotate fastest within their respective cups 11a, ..., 11n. This is due to the track portion 23a, which is towards the shank 4 of the worm 3, making a larger contact area with each spherical face of the balls 13a, ..., 13n than is the case for the track portion 23n which is towards the smaller diameter tip 6 of the worm.

As can be seen from FIG. 1, in the presently described embodiment of the invention four balls, i.e. balls 13a, 13b, 13c, 13d at the instant illustrated in FIG. 1, mesh with the track 23 of worm 3. Each of the balls are in rolling contact with the track of the worm and also with their respective cup 11a, ..., 11d.

Figure 5:
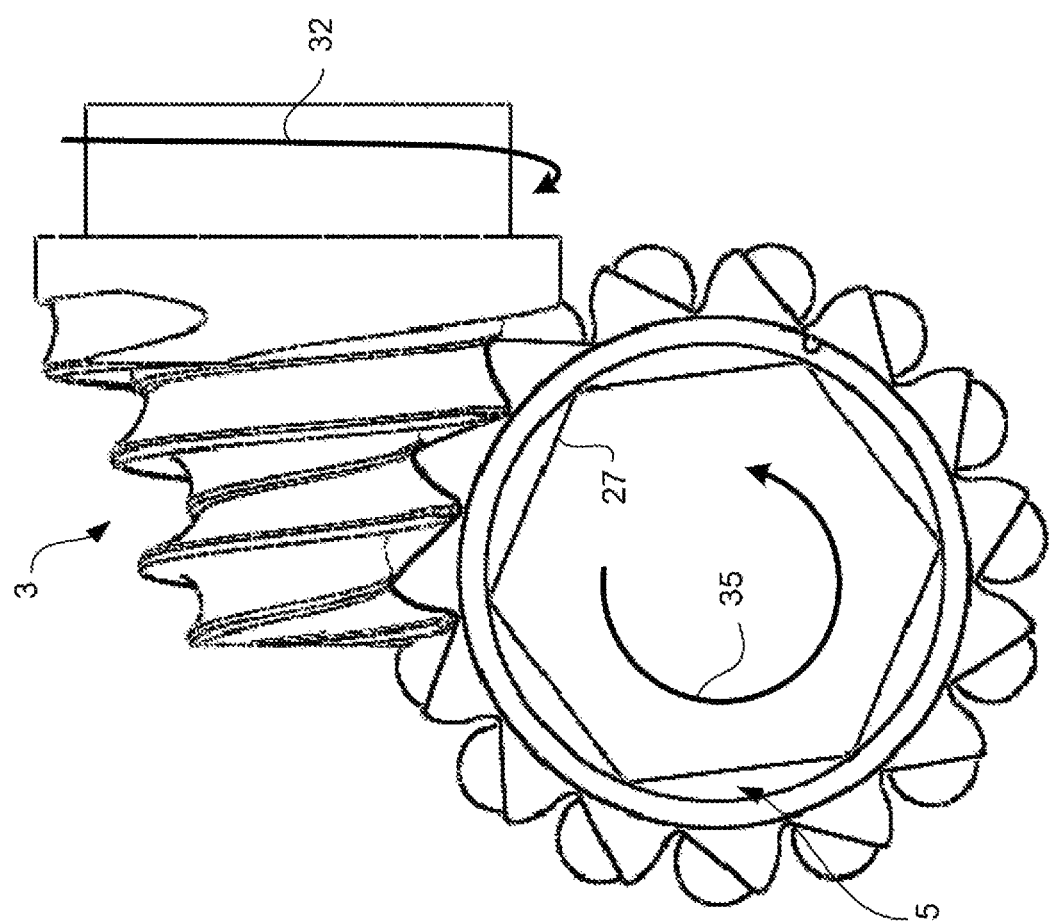
FIG. 5 is a side view of the worm drive of FIG. 1 with housing removed.
Figure 4:
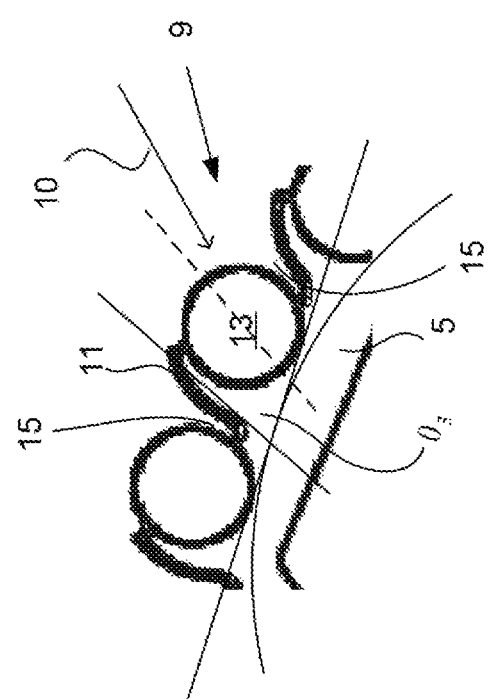
FIG. 4 is a detail of a cross sectional view of a meshing assembly of the worm drive of FIG. 1.

With reference to FIG. 4, in the presently described embodiment, each spherical cup 11a, ..., 11d is aligned at an acute angle of $\theta_3$ (about 60 degrees) to the circumference of the worm wheel 5. The angling of the cup allows a superior line of force 10 to be transmitted from the worm 3 into the worm wheel and then via the socket 27 into the attached device, e.g. a bolt head.) The cup center line (shown dashed in FIG. 4) is inclined towards the worm track to maximize the thrust force off the worm 3 in one rotational direction, i.e. the direction indicated by the arrows 32, 35 in FIG. 5. Furthermore the track 15 (as shown in detail in FIG. 4) is shaped so that it tends to interact with the balls so that the gear is drawn towards the worm 3 which assists in maintaining a tight coupling between the worm and the gear.

Orientating the cups 11a, ..., 11d at angle of attack $\theta_3$ subjects the balls 13a, ..., 13n to compressive force, rather than shear force, from the track 23 of the worm 3. In this way the cups 11a, ..., 11n do not wear on one side. The angling of the cups provides a single direction buttress support that minimizes the separation force experienced by conventional worm wheel drives. Angling the cups also aids the function of the worm drive 1 by providing for a very low separation force between the parent components, i.e. the worm and the worm wheel, while operating at an extreme torque. In this case allowing for the worm wheel 5 to carry the complete separation load without the requirement of other bearings.

If, instead of using an angled cup a flat spherical cup that aligned to the circumference of the bearing wheel were used then the balls would be in shear loading and the cup would thus receive sideways force so that it would be unable to transmit the same high torque loads without high separation forces. These forces would deflect the worm wheel away from the worm and vice versa. Such an arrangement would result in high separation forces that are the same as found in other 90 degree drives where the pinion gear and the crown gear try to separate and as a result are very inefficient.

Figure 6:
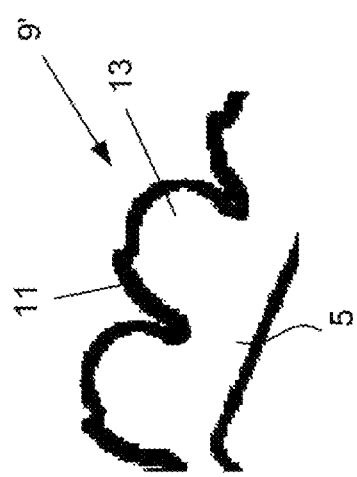
FIG. 6 is a detail view of a portion of a worm drive according to a second embodiment of the present invention.

In the previously described embodiments the balls have been free to rotate in the cups. However, the Inventors have found that it is possible to make the meshing assemblies with the ball 13 and cup 11 as a single solid piece as shown in FIG. 6. In that case the spherical face of the ball 13 is integrally formed with cup 11 and there is no rolling contact. Rather, the meshing assemblies 9' act more in the manner of conventional teeth and must be well lubricated so that excess wear with the track of the worm does not occur. It will be realised that this second embodiment is considerably less desirable than the exemplary embodiment that has been set forth herein with reference to FIG. 1 for example.

While the exemplary worm drive has been described herein in the context of a torque wrench, as illustrated in FIG. 1, it can be used in other applications where high torque transmission mechanisms are required such as gearboxes and winches.

It will be realised that the above description identifies at least one specific, substantial and credible use for the invention.

In compliance with the statute, the invention has been described in language more or less specific to structural or methodical features.

The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

Any embodiment of the invention is meant to be illustrative only and is not meant to be limiting to the invention. Therefore, it should be appreciated that various other changes and modifications can be made to any embodiment described without departing from the spirit and scope of the invention.

The invention claimed is:

1. A worm drive having a worm and a worm wheel, including:
    meshing assemblies comprising a plurality of balls and a plurality of reciprocal cups formed about the worm wheel each meshing assembly comprising one ball of the plurality of balls and one reciprocal cup of the plurality of reciprocal cups, each reciprocal cup having a concave surface and an opposing flat surface, the opposing flat surface having a concave socket complementary to a shape of the ball for receiving a portion of the ball such that a second portion of the ball faces outwardly from the cup to present a spherical face of the ball to the worm, wherein a center line of the cup of each meshing assembly extends through a center of the ball of the meshing assembly and a center of the concave socket of the meshing assembly, wherein the center line forms an acute angle with a tangent line of a periphery of said wheel where the center line intersects the periphery of said wheel;
    wherein the worm concavely tapers toward an end and presents a concavely tapering side profile complementing a peripheral portion of the worm wheel and wherein the worm comprises a concave track complementing the meshing assemblies,
    whereby the spherical faces of the balls mesh with the concave track of the worm and are free to rotate thereby reducing shear forces between the worm and the worm wheel in use; and,
    whereby in use the center line of the cup of each meshing assembly engaged with the worm is inclined toward the worm.

2. A worm drive according to claim 1, wherein the worm comprises at least one helical thread defining a track for the ball.

3. A worm drive according to claim 1, configured as a torque multiplier wherein a complete rotation of the worm causes a partial rotation of the worm wheel about an axis thereof.

4. A worm drive according to claim 1, wherein the worm meshes with at least three meshing assemblies of the worm wheel simultaneously.

5. A worm drive according to claim 3, wherein the worm includes a formation for ready coupling to a driving member.

6. A worm drive according to claim 5 configured as a torque wrench, wherein the worm wheel includes a socket to receive a head of a bolt.

7. A worm drive according to claim 2, configured as a torque multiplier wherein a complete rotation of the worm causes a partial rotation of the worm wheel about an axis thereof.

8. A worm drive according to claim 3, wherein the worm meshes with at least three meshing assemblies of the worm wheel simultaneously.

* * * * *